US012753828B1

(12) United States Patent
Sturgin et al.

(10) Patent No.: US 12,753,828 B1
(45) Date of Patent: Oct. 6, 2026

(54) ACTUATOR USING A WAVE GENERATOR

(71) Applicant: Schaeffler Technologies AG & Co. KG, Herzogenaurach (DE)

(72) Inventors: Todd Sturgin, Wooster, OH (US); Jeffrey Hemphill, Akron, OH (US); Nicholas Hrusch, Wooster, OH (US); Chris Luipold, Wadsworth, OH (US); Joshua Hixenbaugh, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 14 days.

(21) Appl. No.: 19/220,709

(22) Filed: May 28, 2025

(51) Int. Cl.
*F16H 49/00* (2006.01)
*F16H 25/20* (2006.01)

(52) U.S. Cl.
CPC ..... *F16H 25/20* (2013.01); *F16H 2025/2062* (2013.01)

(58) Field of Classification Search
CPC .. F16H 49/001; F16H 2049/008; B25J 9/1025
See application file for complete search history.

(56) References Cited

U.S. PATENT DOCUMENTS

| | | | | | |
|---|---|---|---|---|---|
| 2,882,428 | A | | 4/1959 | Frisch | |
| 2,943,508 | A | * | 7/1960 | Musser | F16J 15/50 74/424.75 |
| 3,077,792 | A | | 2/1963 | Kinderman | |
| 3,427,891 | A | | 2/1969 | Stoddard | |
| 4,557,153 | A | | 12/1985 | Ulbing | |
| 4,854,189 | A | | 8/1989 | Ulbing | |
| 7,975,984 | B1 | * | 7/2011 | Novruzov | F16K 31/508 251/335.1 |

FOREIGN PATENT DOCUMENTS

| | | | | | |
|---|---|---|---|---|---|
| CN | 111779809 | A | * | 10/2020 | F16H 37/124 |
| DE | 10219840 | A1 | | 11/2003 | |
| WO | 2023246965 | A1 | | 12/2023 | |

* cited by examiner

*Primary Examiner* — Randell J Krug
(74) *Attorney, Agent, or Firm* — Price Heneveld LLP

(57) ABSTRACT

An actuator includes a wave generator operable to rotate about an axis. A flex ring is operably coupled with the wave generator, wherein rotation of the wave generator about the axis prompts deformation of the flex ring. A shaft is operably coupled with the flex ring, such that deformation of the flex ring prompted by rotation of the wave generator about the axis prompts axial displacement of the shaft relative to the flex ring.

20 Claims, 10 Drawing Sheets

ACTUATOR USING A WAVE GENERATOR

FIELD OF THE DISCLOSURE

The present disclosure generally relates to an actuator that utilizes a wave generator. More specifically, the present disclosure relates to an actuator that utilizes a wave generator to prompt displacement of a shaft operably coupled with the wave generator.

BACKGROUND OF THE DISCLOSURE

Strain wave generators can be used to increase torque in rotary applications.

SUMMARY OF THE DISCLOSURE

According to a first aspect of the present disclosure, an actuator includes a wave generator having an interior surface that includes an elliptical portion that at least partially defines an aperture extending through the wave generator, the wave generator being operable to rotate about an axis that extends through the aperture. A flex ring extends within the aperture and includes an outer surface that has a plurality of teeth for preventing rotation of the flex ring about the axis and an inner surface that has a plurality of grooves that extend circumferentially along the inner surface of the flex ring. The inner surface defines a hollow. A plurality of rollers extend radially between the outer surface of the flex ring and the elliptical portion of the interior surface of the wave generator, such that rotation of the wave generator about the axis prompts deformation of the flex ring via the plurality of rollers. A shaft that has a threaded portion extends through the hollow defined by the inner surface of the flex ring, wherein the threaded portion of the shaft is operably engaged with the plurality of grooves of the inner surface of the flex ring, such that deformation of the flex ring prompted by rotation of the wave generator about the axis prompts axial displacement of the shaft relative to the flex ring.

Embodiments of the first aspect of the disclosure can include any one or a combination of the following features:

- the flex ring includes a first axial end and a second axial end opposite the first axial end, and the plurality of teeth extend from the first axial end toward the second axial end;
- a body with which the plurality of teeth are configured engages to prevent rotation of the flex ring relative to the body about the axis;
- the plurality of teeth extend from the first axial end toward the second axial end along a first end portion of the outer surface of the flex ring that terminates between the first and second axial ends at a central portion of the outer surface of the flex ring, and wherein the radially-outboard-most portion of the first end portion of the outer surface of the flex ring is radially aligned with or radially inboard of the portion of central portion of the outer surface of the flex ring that is circumferentially aligned with the radially-outboard-most portion of the first end portion of the outer surface of the flex ring;
- the plurality of teeth is a first plurality of teeth and the body is a first body, and wherein the flex ring includes a second plurality of teeth that extend from the second axial end toward the first axial end along a second end portion of the outer surface of the flex ring that terminates at the central portion of the outer surface, the second plurality of teeth being configured to engage a second body to prevent rotation of the flex ring relative to the second body about the axis; and
- the shaft is rotationally fixed relative to the axis.

According to a second aspect of the present disclosure, an actuator includes a wave generator operable to rotate about an axis. A flex ring includes a first axial end, a second axial end opposite the first axial end, an inner surface that extends between the first and second axial ends and that defines a hollow, and an outer surface opposite the inner surface. The outer surface includes a plurality of teeth proximate the first axial end. The flex ring is operably coupled with the wave generator, such that rotation of the wave generator about the axis prompts deformation of the flex ring. The actuator includes a body with which the plurality of teeth are configured to engage to prevent rotation of the flex ring relative to the body about the axis. A shaft extends within the hollow and is operably coupled with the flex ring, such that deformation of the flex ring prompted by rotation of the wave generator about the axis prompts displacement of the shaft.

Embodiments of the second aspect of the disclosure can include any one or a combination of the following features:

- the plurality of teeth extend from the first axial end toward the second axial end along a first end portion of the outer surface of the flex ring that terminates between the first and second axial ends at a central portion of the outer surface of the flex ring, and wherein the radially-outboard-most portion of the first end portion of the outer surface of the flex ring is radially aligned with or radially inboard of the portion of central portion of the outer surface of the flex ring that is circumferentially aligned with the radially-outboard-most portion of the first end portion of the outer surface of the flex ring;
- the plurality of teeth is a first plurality of teeth and the body is a first body, and wherein the flex ring includes a second plurality of teeth that extend from the second axial end toward the first axial end along a second end portion of the outer surface of the flex ring that terminates at the central portion of the outer surface, the second plurality of teeth being configured to engage a second body to prevent rotation of the flex ring relative to the second body about the axis;
- the inner surface of the flex ring includes a plurality of grooves that extend circumferentially along the inner surface of the flex ring, and the shaft has a threaded portion that is operably engaged with the plurality of grooves of the inner surface of the flex ring, such that deformation of the flex ring prompted by rotation of the wave generator about the axis prompts displacement of the shaft;
- the wave generator includes an interior surface that includes an elliptical portion that at least partially defines an aperture extending through the wave generator, and wherein the axis about which the wave generator rotates extends through the aperture;
- a plurality of rollers extend radially between the outer surface of the flex ring and the elliptical portion of the interior surface of the wave generator, such that rotation of the wave generator about the axis prompts deformation of the flex ring via the plurality of rollers;
- deformation of the flex ring prompted by rotation of the wave generator about the axis prompts axial displacement of the shaft; and
- the shaft is rotationally fixed relative to the axis.

According to a third aspect of the present disclosure, an actuator includes a wave generator operable to rotate about an axis. A flex ring is operably coupled with the wave generator and has a plurality of teeth that engage a body of the actuator to prevent rotation of the flex ring about the axis. Rotation of the wave generator about the axis prompts deformation of the flex ring. A driven component is operably coupled with the flex ring, such that deformation of the flex ring prompted by rotation of the wave generator about the axis prompts axial displacement of the driven component relative to the flex ring.

Embodiments of the third aspect of the disclosure can include any one or a combination of the following features:

- the driven component is a shaft, the wave generator defines an aperture, and the flex ring extends within the aperture radially inboard of the wave generator;
- the flex ring defines a hollow, and the shaft extends within the hollow radially inboard of the flex ring;
- the flex ring includes an inner surface that defines the hollow and includes a plurality of grooves that extend circumferentially along the inner surface of the flex ring, and the shaft includes a threaded portion that is operably engaged with the plurality of grooves of the inner surface of the flex ring, such that deformation of the flex ring prompted by rotation of the wave generator about the axis prompts axial displacement of the shaft relative to the flex ring;
- the driven component is rotationally fixed relative to the axis; and
- the flex ring is rotationally fixed relative to the axis.

These and other features, advantages, and objects of the present disclosure will be further understood and appreciated by those skilled in the art by reference to the following specification, claims, and appended drawings.

Figure 1:
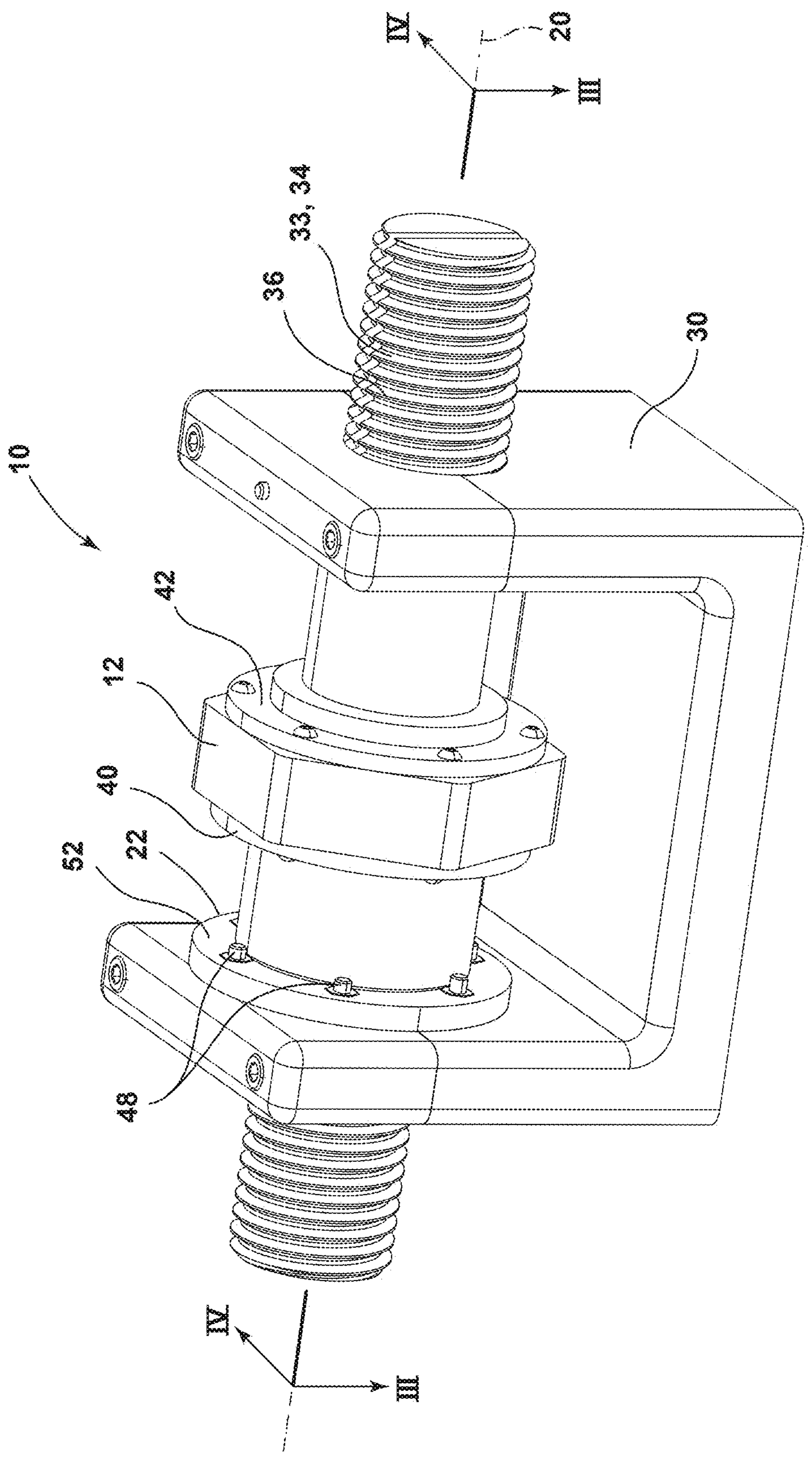
FIG. 1 is a perspective view of an actuator that includes a wave generator, a flex ring, and a shaft, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along an axis about which a wave generator is configured to rotate in operation of the apparatus described herein. Further, the term "radial" and derivatives thereof, such as "radially," shall be understood in relation to the aforementioned axis. For example, "radially outboard" refers to further away from the axis, while "radially inboard" refers to nearer to the axis. The term "circumferential" and derivatives thereof, such as "circumferentially," shall be understood in relation to the aforementioned axis.

Referring now to FIGS. 1-11, an actuator 10 includes a wave generator 12. The wave generator 12 includes an interior surface 14 that has an elliptical portion 16 that at least partially defines an aperture 18 extending through the wave generator 12. The wave generator 12 is operable to rotate about an axis 20 that extends through the aperture 18. A flex ring 22 extends within the aperture 18. The flex ring 22 includes an outer surface 24 and an inner surface 26. The inner surface 26 includes a plurality of grooves 28 that extend circumferentially along the inner surface 26 of the flex ring 22. The inner surface 26 defines a hollow 30. A plurality of rollers 32 extend radially between the outer surface 24 of the flex ring 22 in the elliptical portion 16 of the interior surface 14 of the wave generator 12, such that rotation of the wave generator 12 about the axis 20 prompts deformation of the flex ring 22 via the plurality of rollers 32. A shaft 34 has a threaded portion 36 and extends through the hollow 30 defined by the inner surface 26 of the flex ring 22. The threaded portion 36 of the shaft 34 is operably engaged with the plurality of grooves 28 of the inner surface 26 of the flex ring 22, such that deformation of the flex ring 22 prompted by rotation of the wave generator 12 about the axis 20 prompts axial displacement of the shaft 34 relative to the flex ring 22.

Referring now to FIGS. 1-4 and 7-9, the actuator 10 includes a housing 38. In the illustrated embodiments, the housing 38 is a plurality of components that are assembled to each other. In various embodiments, the wave generator 12 is configured to rotate about the axis 20 relative to the housing 38, and the shaft 34 is configured to be displaced relative to the housing 38 in operation of the actuator 10. It is contemplated that the housing 38 may be a variety of types of housings and that the actuator 10 may be utilized in various systems.

Figure 3:
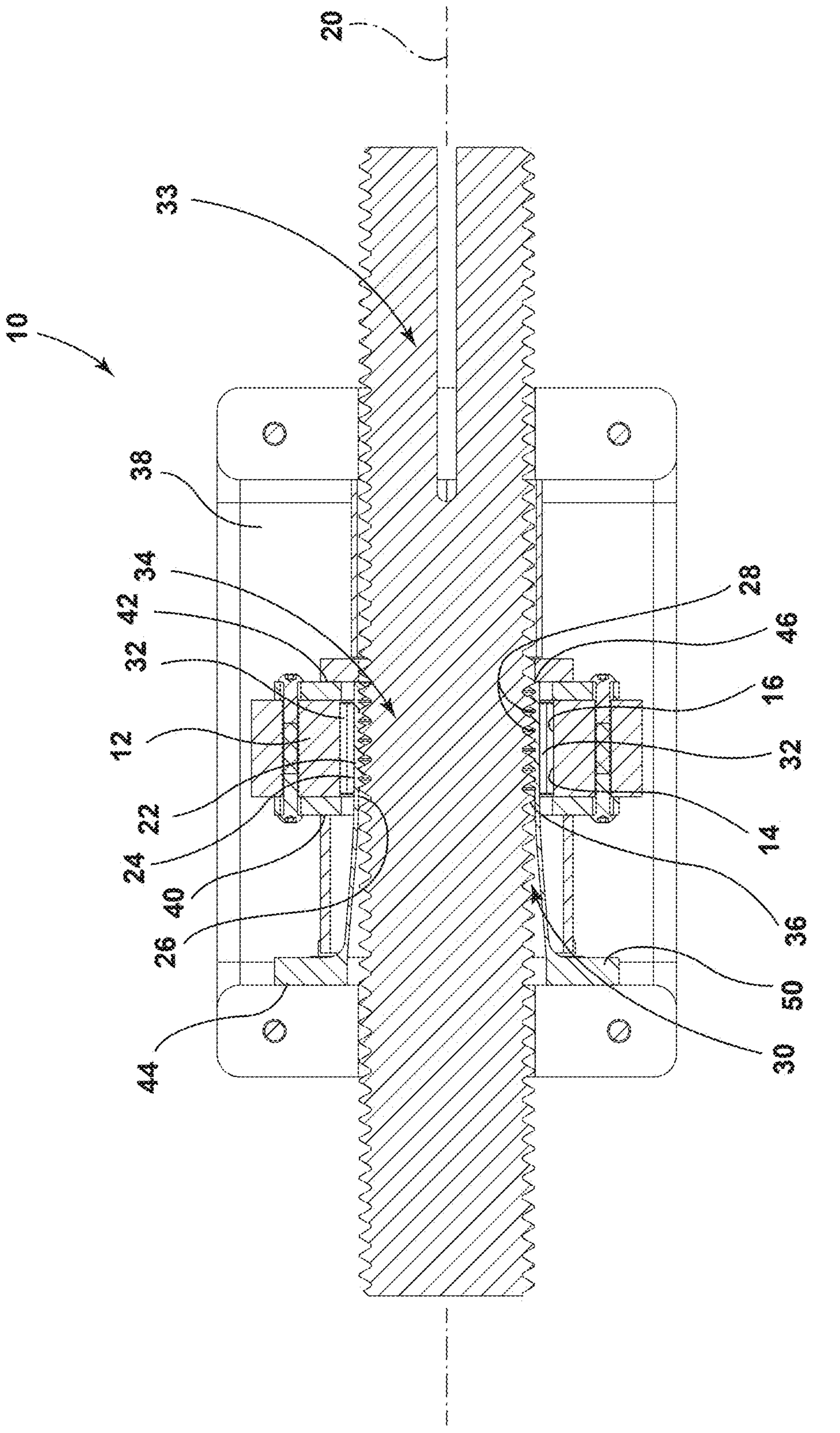
FIG. 3 is a cross-sectional view of the actuator of FIG. 1 taken at line III-III, illustrating a threaded portion of the shaft in contact with a plurality of grooves of an inner surface of the flex ring, according to one embodiment.
Figure 4:
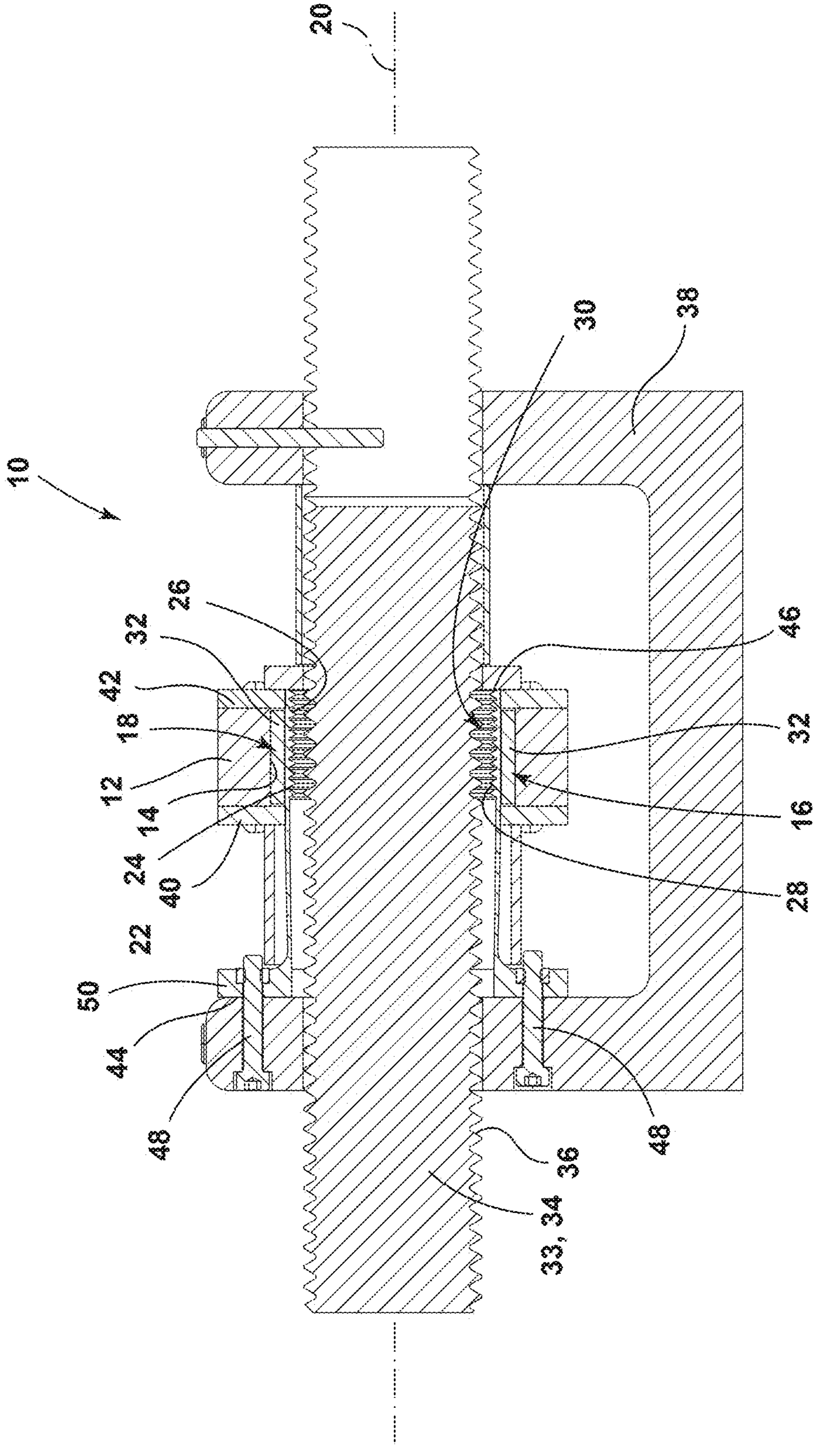
FIG. 4 is a cross-sectional view of the actuator of FIG. 1 taken at line IV-IV, illustrating the threaded portion of the shaft in a spaced relationship with the plurality of grooves of the inner surface of the flex ring, according to one embodiment.
Figure 5:
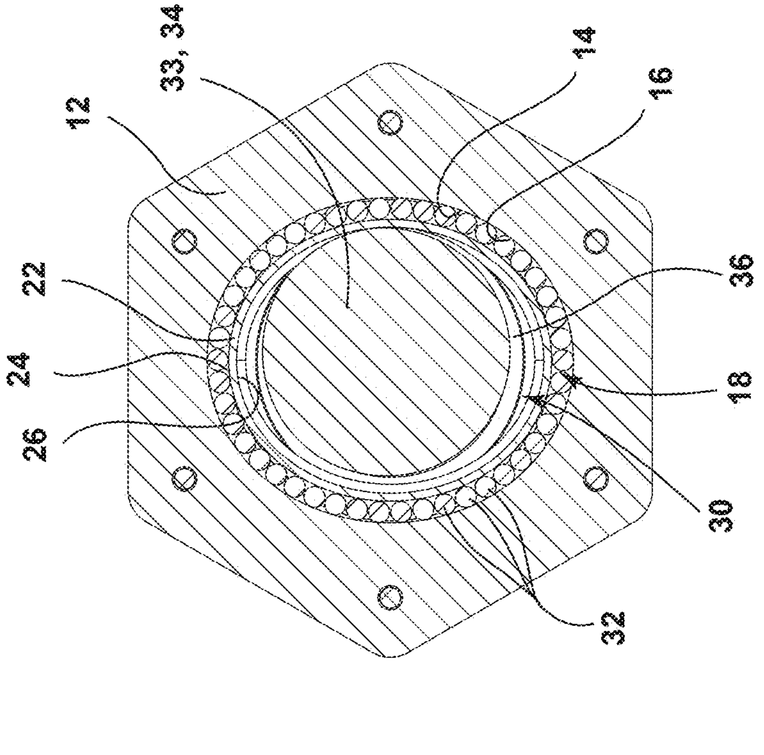
FIG. 5 is a cross-sectional view of a portion of the actuator of FIG. 1, illustrating the wave generator that includes an interior surface having an elliptical portion that defines an aperture, a plurality of rollers disposed radially inboard of the interior surface, the flex ring radially inboard of the plurality of rollers, and the shaft positioned radially inboard of the flex ring within a hollow defined by the flex ring, according to one embodiment.
Figure 6:
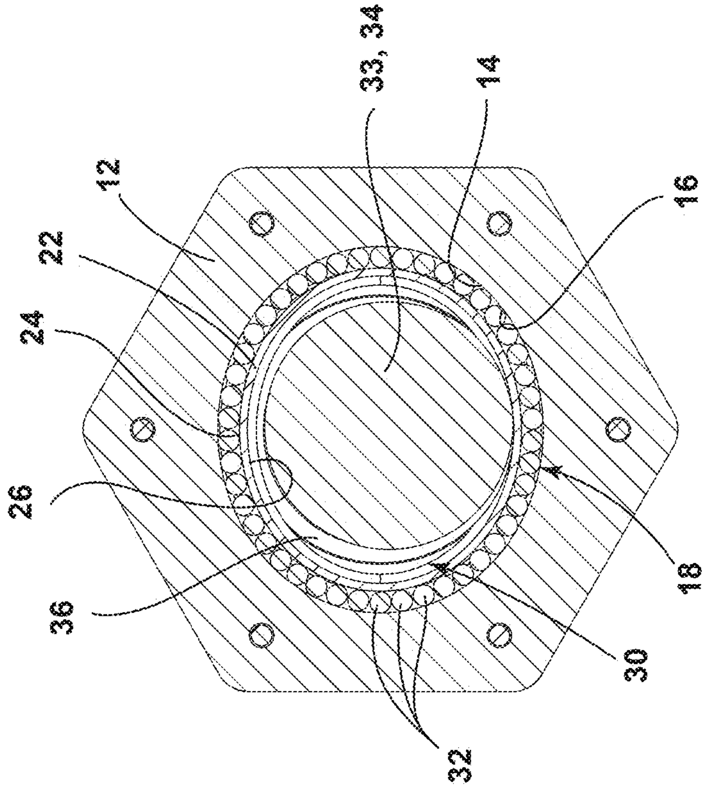
FIG. 6 is a cross-sectional view of the actuator of FIG. 1, illustrating the orientation of the components of the actuator when the wave generator is rotated a quarter turn clockwise relative to the position of the wave generator illustrated in FIG. 5, according to one embodiment.
Figure 7:
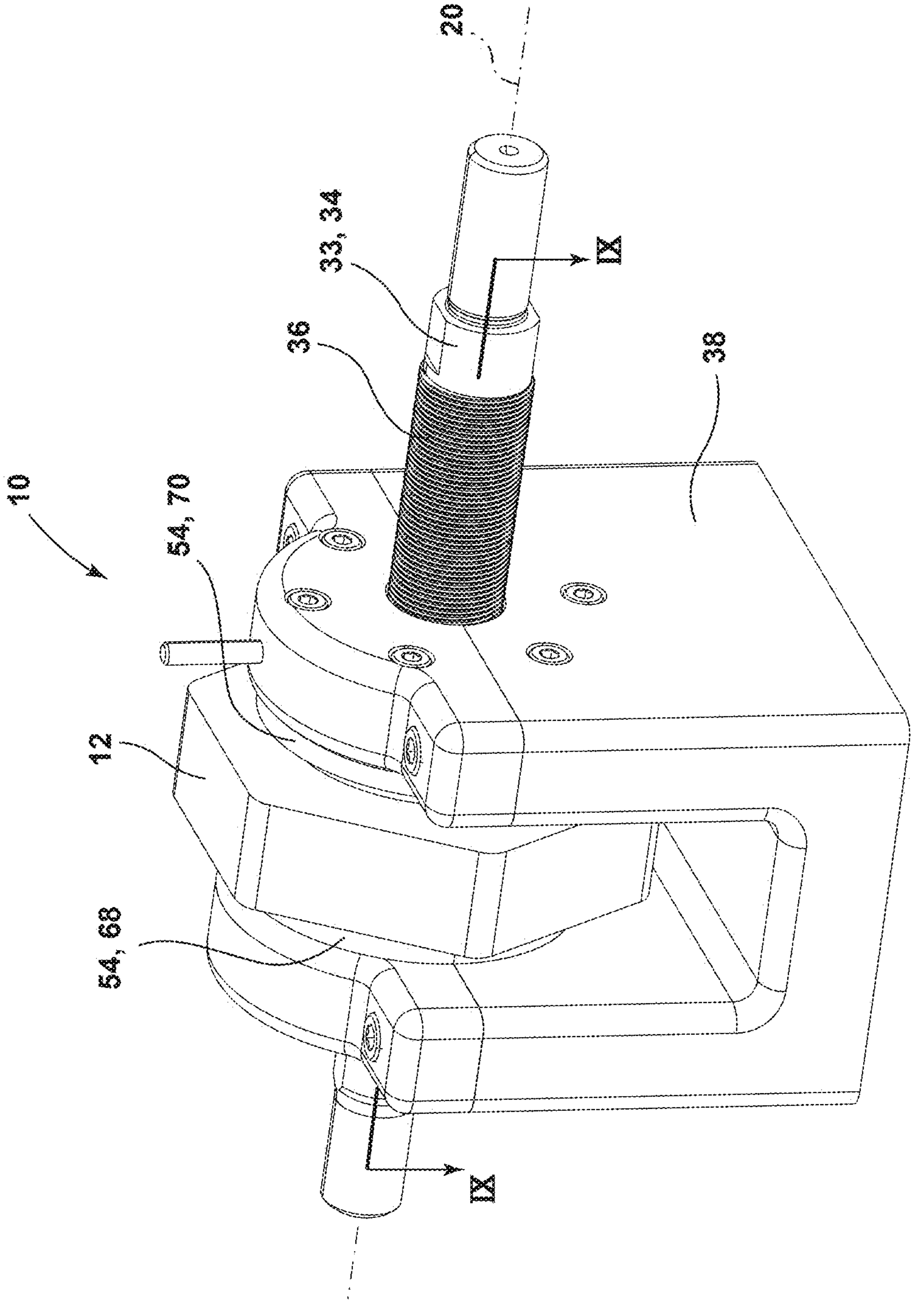
FIG. 7 is a perspective view of an actuator that includes a shaft and a wave generator, according to one embodiment.

Referring now to FIGS. 1-9, the actuator 10 includes the wave generator 12. The wave generator 12 includes the interior surface 14. As illustrated in FIGS. 5 and 6, the interior surface 14 of the wave generator 12 can include the elliptical portion 16. The elliptical portion 16 can at least partially define the aperture 18 that extends through the wave generator 12. It is contemplated that the interior surface 14 of the wave generator 12 may include a non-cylindrical portion (such as the elliptical portion 16) having one or more of a variety of shapes (e.g., tri-lobe, quad-lobe, etc.), in various embodiments. The wave generator 12 is operable to rotate about the axis 20. The axis 20 extends through the aperture 18 defined by the interior surface 14 of the wave generator 12, in various implementations.

Figure 2:
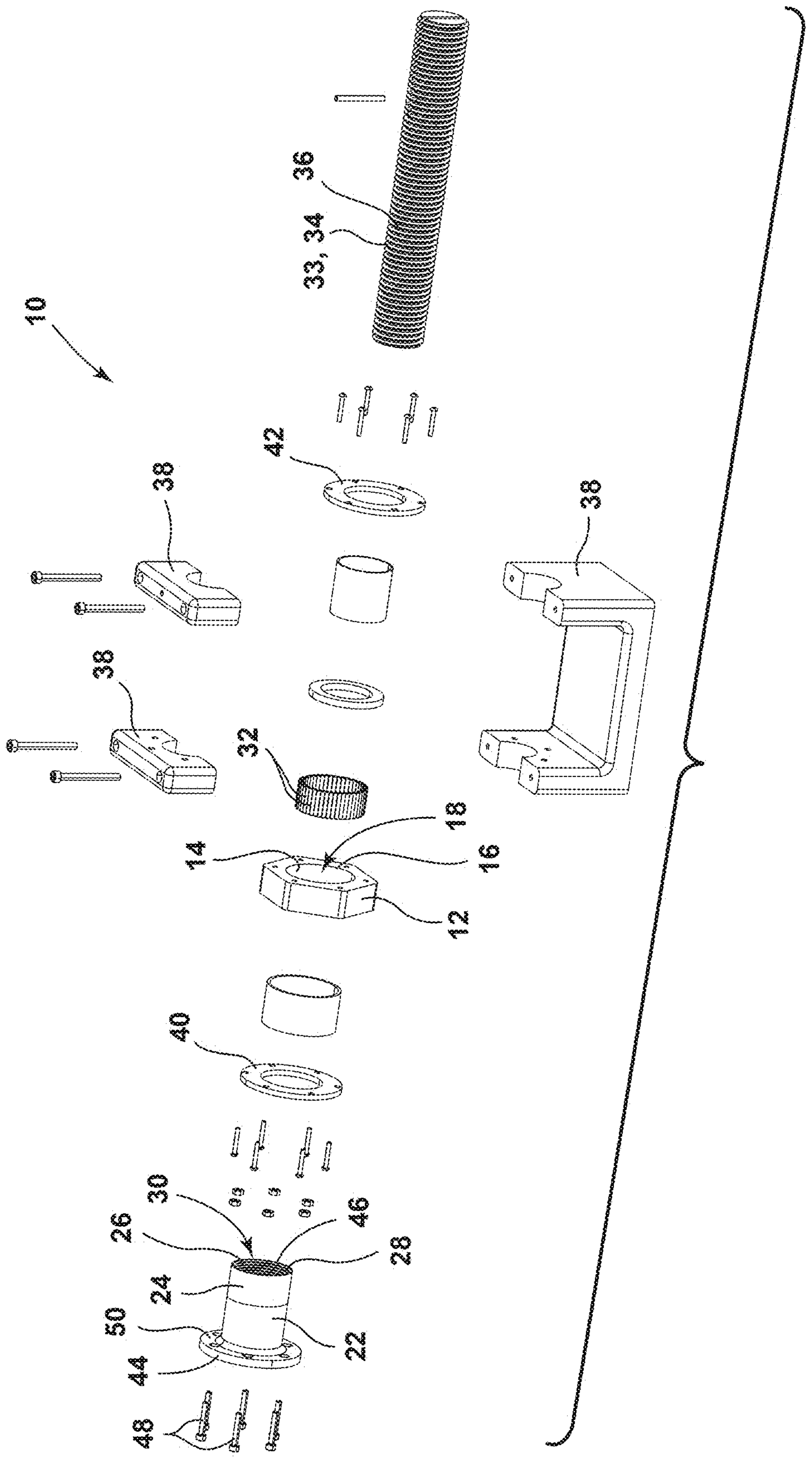
FIG. 2 is an exploded perspective view of the wave generator of FIG. 1, illustrating a housing, the wave generator, the flex ring, the shaft, first and second retainer rings, and a plurality of rollers, according to one embodiment.

Referring now to FIGS. 2-6, the actuator 10 includes the plurality of rollers 32. As illustrated in FIGS. 5 and 6, the plurality of rollers 32 are positioned radially inboard of the interior surface 14 of the wave generator 12. In various implementations, the plurality of rollers 32 contact the elliptical portion 16 of the interior surface 14 of the wave generator 12. As such, the rollers 32 may be arranged elliptically along the interior surface 14 of the wave generator 12, as illustrated in FIGS. 5 and 6. In the embodiment illustrated in FIGS. 2-6, the plurality of rollers 32 are cylindrical rollers. A variety of types of rollers 32 are contemplated. As illustrated in FIGS. 2 and 3, the actuator 10 can include first and second retainer rings 40, 42 that are respectively positioned adjacent to axial ends of the wave generator 12. As illustrated in FIGS. 3 and 4, the first and second retainer rings 40, 42 extend radially-inboard beyond the interior surface 14 of the wave generator 12. As such, the first and second retainer rings 40, 42 are operable to retain the plurality of rollers 32 in the desired axial position, wherein the rollers 32 are aligned with the elliptical portion 16 of the interior surface 14 of the wave generator 12.

Referring now to FIGS. 1-11, the actuator 10 includes the flex ring 22. The flex ring 22 may extend within and/or through the aperture 18 defined by the wave generator 12. In various embodiments, the plurality of rollers 32 may be positioned radially between the flex ring 22 and the wave generator 12, as described further herein. The flex ring 22 may be formed of a flexible material (e.g., thin-walled metal, plastic, etc.) that is configured to undergo deformation without breaking in operation of the actuator 10. In various implementations, force transferred from the wave generator 12 to the flex ring 22 via the plurality of rollers 32 as the wave generator 12 rotates about the axis 20 may prompt deformation of the flex ring 22, as described further herein.

Referring still to FIGS. 1-11, the flex ring 22 extends from the first axial end 44 to the second axial end 46 opposite the first axial end 44 and includes the inner surface 26 and the outer surface 24. The inner surface 26 of the flex ring 22 can face radially inboard. In various embodiments, the inner surface 26 of the flex ring 22 defines the hollow 30. The hollow 30 may extend from an opening at the first axial end 44 of the flex ring 22 to an opening at the second axial end 46 of the flex ring 22. The hollow 30 may receive the shaft 34 of the actuator 10 therein and/or therethrough, in various embodiments, as described further herein. As illustrated exemplarily in FIGS. 3, 4, 9, and 10, in various embodiments, the inner surface 26 of the flex ring 22 includes the plurality of grooves 28 that extend circumferentially along the inner surface 26 of the flex ring 22. Each of the plurality of grooves 28 may be axially offset from each other groove in the plurality of grooves 28.

Referring still to FIGS. 1-11, the outer surface 24 of the flex ring 22 is opposite the inner surface 26 of the flex ring 22. In various embodiments, the outer surface 24 of the flex ring 22 faces radially outboard. For example, as illustrated in FIGS. 3-6 and 9, the outer surface 24 of the flex ring 22 is opposite and radially outboard of the inner surface 26 and faces radially outboard while the inner surface 26 faces radially inboard. In various implementations, the plurality of rollers 32 are positioned radially between the outer surface 24 of the flex ring 22 and the interior surface 14 of the wave generator 12. For example, as illustrated in FIGS. 3-6, the plurality of rollers 32 extend radially from the outer surface 24 of the flex ring 22 to the elliptical portion 16 of the interior surface 14 of the wave generator 12.

Referring still to FIGS. 1-11, in various embodiments, the flex ring 22 may be rotationally fixed relative to the axis 20 about which the wave generator 12 is configured to rotate. In the embodiment illustrated in FIGS. 1-4, the flex ring 22 is rotationally fixed relative to the axis 20 by way of fasteners 48 that extend through a flange 50 of the flex ring 22 that extends radially outboard proximate to the first axial end 44 of the flex ring 22. The fasteners 48 extend through the flange 50 and into a portion of the housing 38 of the actuator 10, rotationally fixing the flex ring 22 thereby. In some embodiments, the flex ring 22 may be rotationally fixed relative to the axis 20 via engagement of a plurality of teeth 52 of the flex ring 22 with a body 54 of the actuator 10. For example, the outer surface 24 of the flex ring 22 may include the plurality of teeth 52 that extend axially from the first and/or second axial ends 44, 46 of the flex ring 22 and engage with corresponding teeth 56 of one or more bodies 54 of the actuator 10 to rotationally fix the flex ring 22 relative to the axis 20 about which the wave generator 12 rotates.

Figure 8:
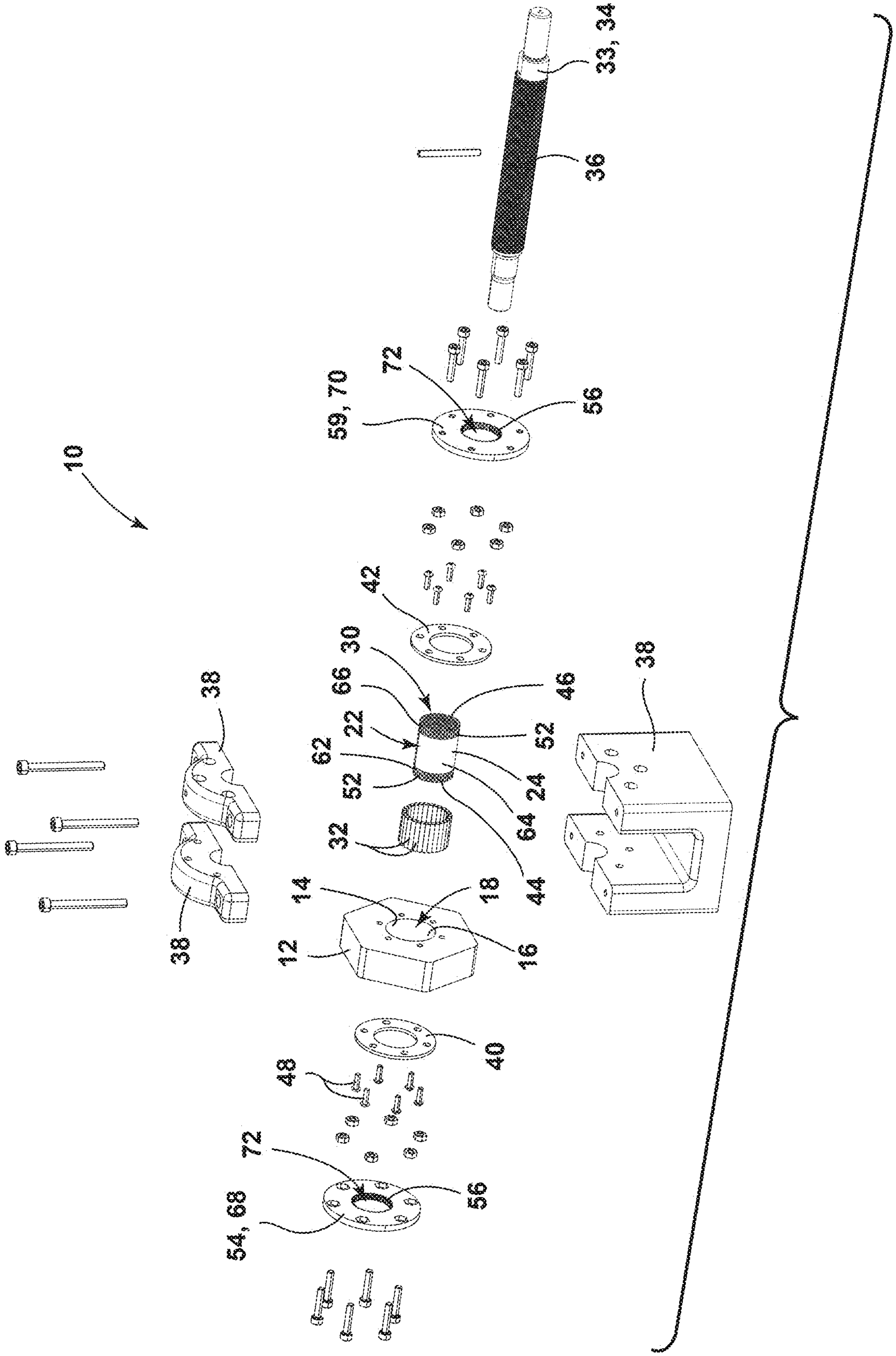
FIG. 8 is an exploded perspective view of the actuator of FIG. 7, illustrating a housing, the wave generator, the shaft, a plurality of rollers, a flex ring, a first body, and a second body, according to one embodiment.
Figure 9:
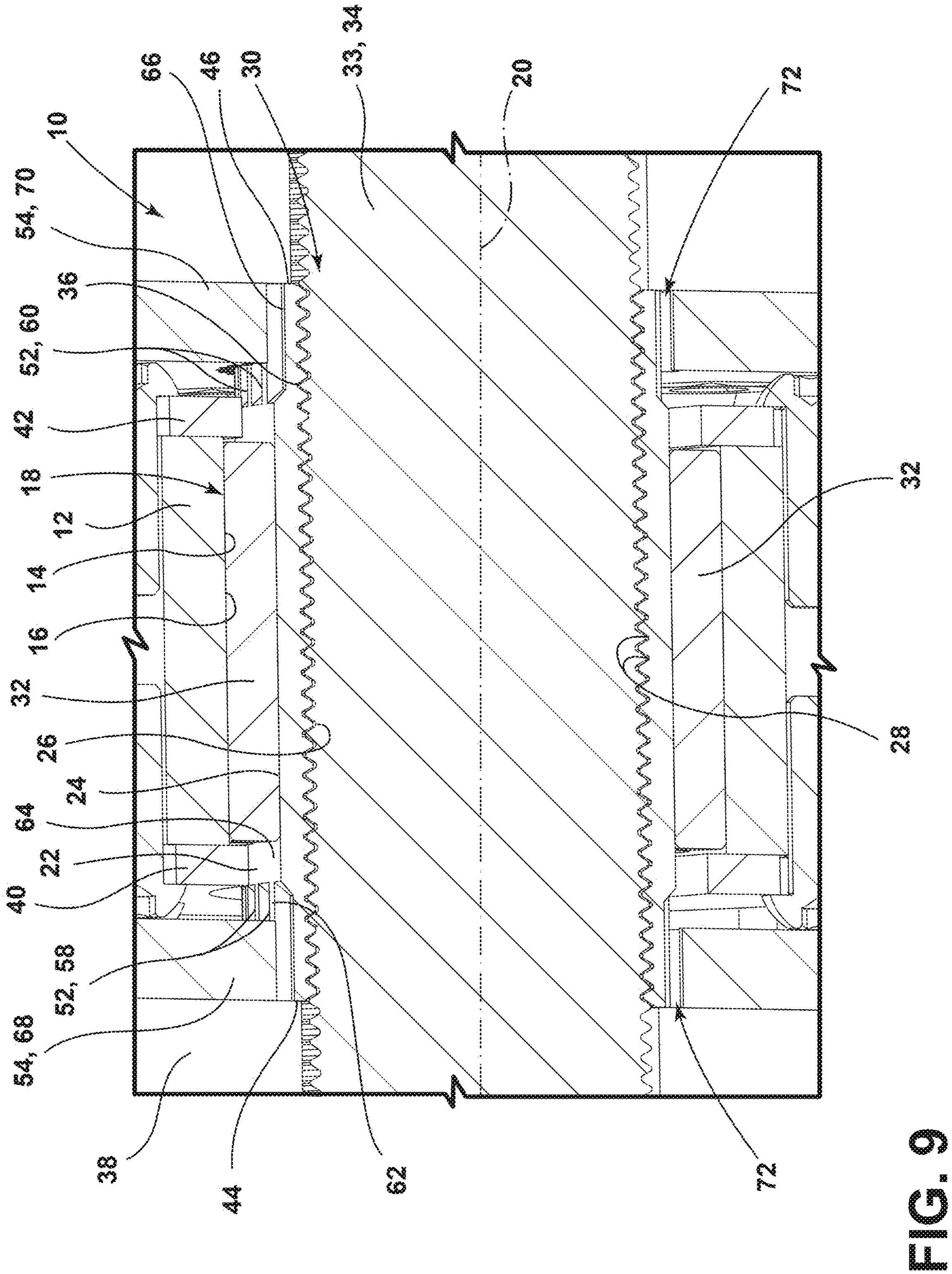
FIG. 9 is a cutaway view of the actuator of FIG. 7. Taken at line IX-IX, illustrating the plurality of grooves of an inner surface of the flex ring engaged with a threaded portion of the shaft, and first and second pluralities of teeth of the outer surface of the flex ring engaged with the first and second bodies of the actuator, according to one embodiment.

Referring now to FIGS. 7-11, an exemplary embodiment of the actuator 10 that has a flex ring 22 that includes a first plurality of teeth 58 and a second plurality of teeth 60 is illustrated. The first plurality of teeth 58 are circumferentially offset from one another, have radial depth, and extend axially from the first axial end 44 toward the second axial end 46 of the flex ring 22 along a first end portion 62 of the outer surface 24 of the flex ring 22. The first end portion 62 terminates between the first and second axial ends 44, 46 at a central portion 64 of the outer surface 24 of the flex ring 22. The second plurality of teeth 60 are circumferentially offset from one another, have radial depth, and extend from the second axial end 46 of the flex ring 22 toward the first axial end 44 along a second end portion 66 of the outer surface 24 of the flex ring 22. The second end portion 66 of the outer surface 24 of the flex ring 22 terminates between the first and second axial ends 44, 46, such that the central portion 64 extends axially between the first and second end portions 62, 66 of the outer surface 24 of the flex ring 22, as illustrated in FIGS. 8 and 9. The central portion 64 of the outer surface 24 of the flex ring 22 can interface with the plurality of rollers 32 in operation of the actuator 10, as illustrated in FIG. 9 and described further herein.

Figure 10:
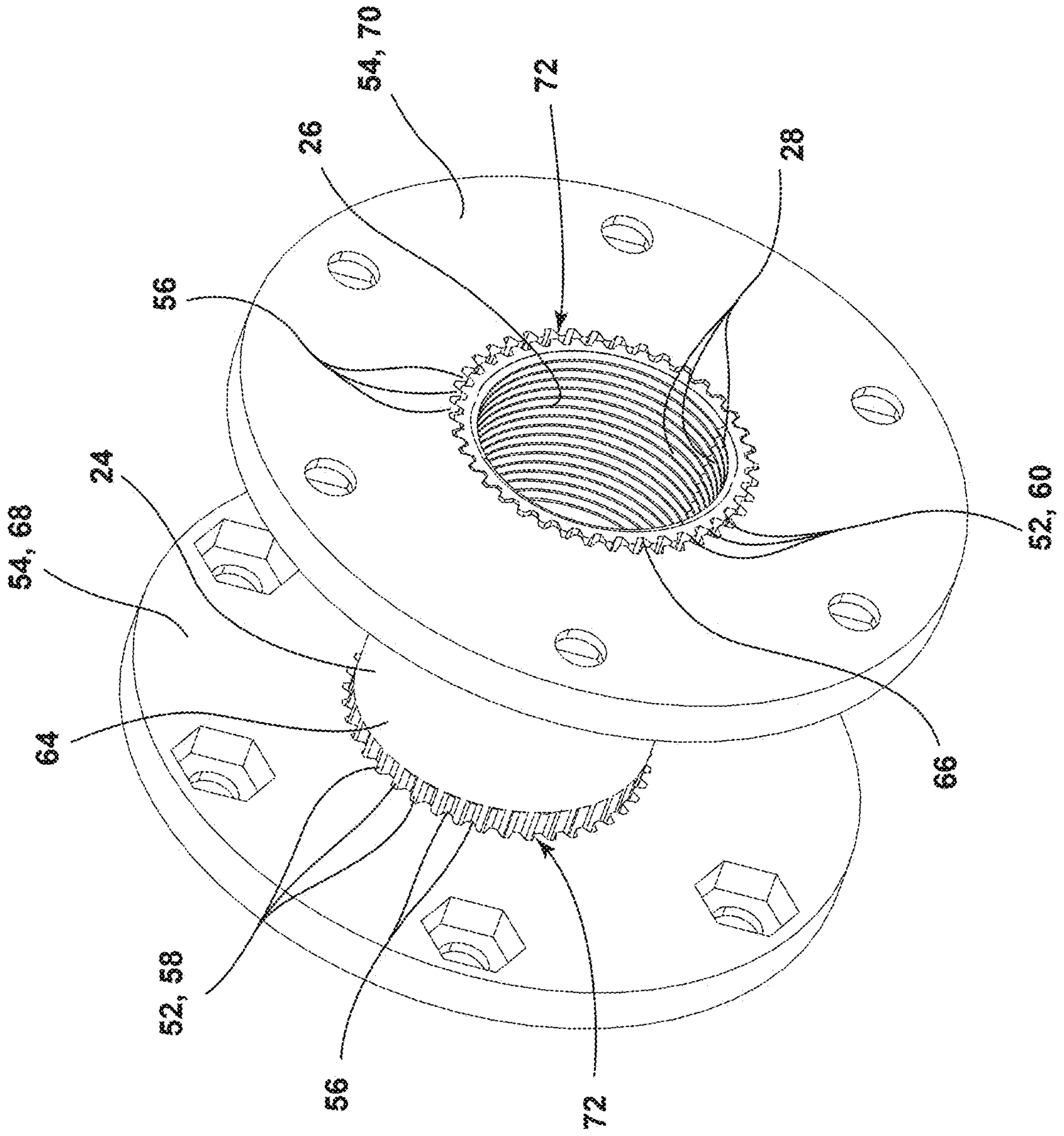
FIG. 10 is a perspective view of the first body of the actuator, the second body of the actuator, and the flex ring engaged with the first and second bodies via first and second pluralities of teeth, respectively, according to one embodiment.

Referring still to FIGS. 7-11, in the exemplary embodiment of the actuator 10, the actuator 10 includes a first body 68 and a second body 70. As illustrated in FIGS. 8 and 10, the first and second bodies 68, 70 resemble plates, each having a plurality of corresponding teeth 56 that collectively extend about and define a central aperture 72. The first and second bodies 68, 70 of the actuator 10 are rotationally fixed relative to the axis 20 about which the wave generator 12 rotates (e.g., fastened to the housing 38). Further, as illustrated in FIG. 10, the first end portion 62 of the outer surface 24 of the flex ring 22 extends into the central aperture 72 of the first body 68, such that the first plurality of teeth 58 of the flex ring 22 are engaged with the corresponding teeth 56 of the first body 68 of the actuator 10. Further, the second end portion 66 of the outer surface 24 of the flex ring 22 extends into the central aperture 72 defined by the second body 70, such that the second plurality of teeth 60 are engaged with the corresponding teeth 56 of the second body 70 of the actuator 10. As such, the flex ring 22 of the exemplary embodiment is rotationally fixed relative to the axis 20 by way of the engagement of the first and second pluralities of teeth 58, 60 with the first and second bodies 68, 70, respectively. Thus, rotation of the flex ring 22 about the axis 20 in operation of the actuator 10 may advantageously be prevented.

Figure 11:
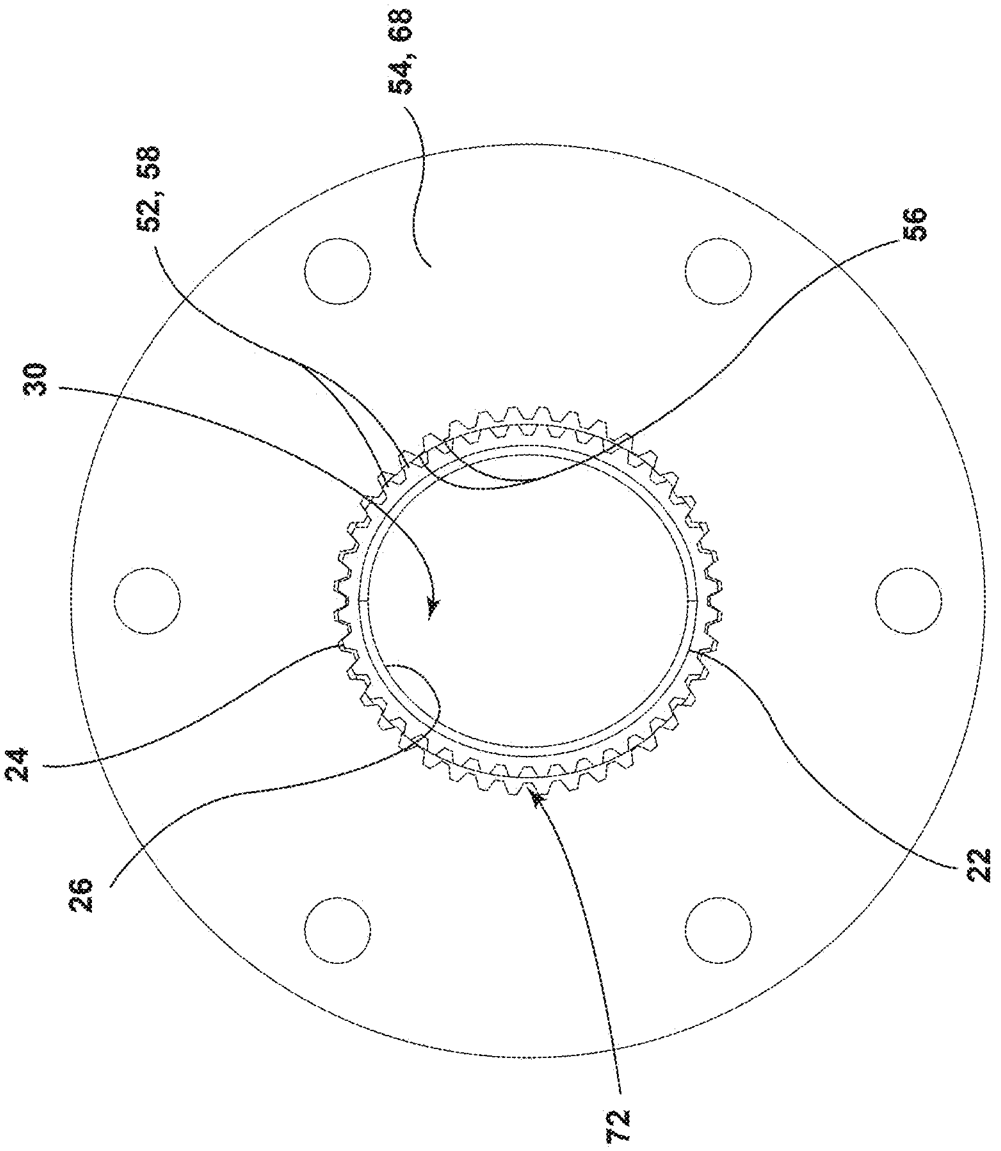
FIG. 11 is an elevational view of a body of the actuator and a flex ring of the actuator, illustrating teeth of the outer surface of the flex ring engaged with the body, according to one embodiment.

As illustrated in FIGS. 10 and 11, in various embodiments, the number of teeth 58 in the first plurality of teeth 58 may be equal to the number of corresponding teeth 56 of the first body 68. Further, the number of teeth 60 in the second plurality of teeth 60 may be equal to the number of corresponding teeth 56 of the second body 70. As such, in operation of the actuator 10, although teeth 58, 60 from the first and second pluralities of teeth 58, 60 cycle into and out of engagement with the corresponding teeth 56 of the first and second bodies 68, 70, respectively, as deformation of the flex ring 22 occurs, each tooth 58 in the first plurality of teeth 58 is received between the same two adjacent corresponding teeth 56 of the first body 68, respectively, when engaged. Likewise, each tooth 60 in the second plurality of teeth 60 is received between the same two adjacent corresponding teeth 56 of the second body 70, respectively, when engaged. As such, although teeth 58, 60 of the first and second pluralities of teeth 58, 60 cyclically transition into and out of engagement with the corresponding teeth 56 of the first and second bodies 68, 70, rotation of the first and second bodies 68, 70 relative to the flex ring 22 is avoided.

Referring now to FIGS. 9 and 10, at a given circumferential position along the outer surface 24 of the flex ring 22, the first and/or second end portions 62, 64 of the outer surface 24 of the flex ring 22 may be radially aligned with and/or radially-inboard of the central portion 64 of the outer surface 24 of the flex ring 22 at the given circumferential position. For example, as illustrated in FIGS. 9 and 10, the radially-outboard-most portions of each of the teeth 58, 60 that are in the first and second pluralities of teeth 58, 60 are substantially radially aligned with the adjacent, circumferentially-aligned portions of the central portion 64 of the outer surface 24 of the flex ring 22. In the illustrated embodiment, the radially-outboard most portions of the teeth 52 extend from the adjacent central portion 64 relatively seamlessly without protruding radially-outboard therefrom. It is contemplated that different teeth 52 of the flex ring 22 extend radially outboard different amounts relative to each other at a given time due to elliptical deformation of the flex ring 22 by the wave generator 12. However, despite such deformation, the radially-outboard-most portion of the first end portion 62 of the outer surface 24 of the flex ring 22 may be radially aligned with and/or radially inboard of the portion of the central portion 64 of the outer surface 24 of the flex ring 22 that is circumferentially aligned with the radially-outboard-most portion of the first end portion 62 of the outer surface 24 of the flex ring 22. Shaped as such, the flex ring 22 may deform relatively uniformly along its axial length during operation of the actuator 10, resulting in reduced wear relative to the flex ring 22 that employs the radially-outboard extending flange 50 for the purpose of rotationally fixing the flex ring 22 relative to the axis 20.

Referring now to FIGS. 1-9, the flex ring 22 can be operably coupled with the wave generator 12, such that rotation of the wave generator 12 about the axis 20 prompts the deformation of the flex ring 22. In the embodiment illustrated in FIGS. 1-6, the wave generator 12 includes the interior surface 14 that has the elliptical portion 16, and the plurality of rollers 32 are positioned radially between the outer surface 24 of the flex ring 22 and the elliptical portion 16 of the interior surface 14 of the wave generator 12. In the illustrated embodiment, rotation of the wave generator 12 about the axis 20 prompts deformation of the flex ring 22 via the plurality of rollers 32 that are displaced in accordance with the movement of the elliptical portion 16 of the interior surface 14 of the wave generator 12 as the wave generator 12 rotates. This cyclical deformation of the flex ring 22 generally conforms to the elliptical shape of the elliptical portion 16 of the interior surface 14 of the wave generator 12 and the circumferential orientation thereof. This deformation is illustrated in FIGS. 5 and 6.

As depicted in FIG. 5, the wave generator 12 is oriented such that the elliptical portion 16 of the interior surface 14 of the wave generator 12 is elongated in a vertical direction from the perspective of the viewer. As such, the plurality of rollers 32 are distributed elliptically in a likewise manner along the elliptical portion 16 of the interior surface 14, and the flex ring 22 is deformed into an elliptical configuration that is elongated in the vertical direction. As depicted in FIG. 6, the wave generator 12 is rotated a quarter-turn clockwise about the axis 20 from the perspective of the viewer relative to that of FIG. 5, while the flex ring 22 shown in FIG. 6 shares the same rotational position as that of FIG. 5 from the perspective of the viewer. In the illustrated embodiment, the elliptical portion 16 of the interior surface 14 of the wave generator 12 is elongated in the horizontal direction from the perspective of the viewer. Further, the plurality of rollers 32 are arranged elliptically along the elliptical portion 16 of the interior surface 14, and the flex ring 22 is deformed by the constraining force of the rollers 32 into an elliptical configuration that is elongated in the horizontal direction from the perspective of the viewer. As such, in various embodiments, as the wave generator 12 rotates and causes cyclical rearrangement of the positions of the plurality of rollers 32, the flex ring 22 is deformed by the plurality of rollers 32 to an elliptical shape, the elongated direction of which follows with the elongated direction of the elliptical portion 16 of the interior surface 14 of the wave generator 12.

Referring now to FIGS. 1-9, the actuator 10 includes a driven component 33. The driven component 33 may include the threaded portion 36. In various implementations, the driven component 33 may be operably coupled with the flex ring 22, such that deformation of the flex ring 22 that is prompted by rotation of the wave generator 12 prompts displacement of the driven component 33 relative to the axis 20 and/or the flex ring 22, such as axial displacement relative to the flex ring 22. The drive component 33 can be a nut with an internal interface that includes the threaded portion 36, that is configured to be operably coupled with the flex ring 22 that is disposed radially-inboard of the nut, in some embodiments. In various embodiments, the driven component 33 is the shaft 34. In various implementations, the shaft 34 extends within the aperture 18 defined by the wave generator 12 and/or within the hollow 30 defined by the inner surface 26 of the flex ring 22. In the embodiment illustrated in FIGS. 1-4, the shaft 34 extends through both the aperture 18 defined by the interior surface 14 of the wave generator 12 and the hollow 30 defined by the inner surface 26 of the flex ring 22. The shaft 34 may be rotationally fixed relative to the axis 20 about which the wave generator 12 rotates in operation of the actuator 10. In various implementations, the shaft 34 is operably coupled with the flex ring 22. In the embodiment illustrated in FIGS. 1-6, the shaft 34 includes the threaded portion 36, and the threaded portion 36 of the shaft 34 is operably engaged with the plurality of grooves 28 of the inner surface 26 of the flex ring 22. It is contemplated that the shaft 34 and the flex ring 22 may be operably engaged in a variety of manners. Further, it is contemplated that the threaded portion 36 may utilize a single-start thread design, as illustrated in FIGS. 3 and 4, and/or a multi-start thread design, as illustrated exemplarily in FIG. 9.

In various embodiments, the shaft 34 may be operably coupled with the flex ring 22, such that deformation of the flex ring 22 prompted by rotation of the wave generator 12 about the axis 20 prompts displacement of the shaft 34. In some embodiments, deformation of the flex ring 22 that is prompted by rotation of the wave generator 12 prompts displacement of the shaft 34 relative to the axis 20. In some embodiments, the deformation of the flex ring 22 prompted by rotation of the wave generator 12 about the axis 20 prompts axial displacement of the shaft 34 relative to the axis 20 and/or the flex ring 22, as described further herein.

In the embodiments illustrated in FIGS. 1-9, the shaft 34 includes the threaded portion 36, and the inner surface 26 of the flex ring 22 includes the plurality of grooves 28 that extend circumferentially there along. In various embodiments, the inner surface 26 of the flex ring 22 and the shaft 34 are operably engaged with each other via the plurality of grooves 28 and the threaded portion 36 of the shaft 34. In an exemplary embodiment, the inner surface 26 of the flex ring 22 and the shaft 34 are operably engaged with each other via contact between the plurality of grooves 28 of the inner surface 26 of the flex ring 22 and the threaded portion 36 of the shaft 34. In operation of the actuator 10, as the wave generator 12 rotates and deforms the rotationally-fixed flex ring 22 into an elliptical shape, the elongated direction of which follows the rotation of the wave generator 12, the plurality of grooves 28 that extend circumferentially along the inner surface 26 of the flex ring 22 interface with the threaded portion 36 of the shaft 34.

As illustrated in FIGS. 3 and 4, at a given point in time, for each of the plurality of grooves 28 that interfaces with the threaded portion 36 of the shaft 34, only a portion of each such groove 28 interfaces with the threaded portion 36. For example, as illustrated in FIGS. 3 and 4, the portions of the plurality of grooves 28 disposed at the nearest opposing sides of the elliptically deformed inner surface 26 of the flex ring 22 interface with the threaded portion 36 of the shaft 34 (FIG. 3), while the portions of the same grooves 28 that are disposed at the farthest opposing sides of the elliptically deformed inner surface 26 of the flex ring 22 are in a spaced relationship with the threaded portion 36 (FIG. 4). As the wave generator 12 rotates and causes the flex ring 22 to cyclically deform, the grooves 28 of the inner surface 26 of the flex ring 22 apply an axial force to the threaded portion 36 of the shaft 34, which moves the rotationally-fixed shaft 34 axially relative to the flex ring 22.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 actuator
12 wave generator
14 interior surface
16 elliptical portion
18 aperture
20 axis
22 flex ring
24 outer surface
26 inner surface
28 groove
30 hollow
32 roller
34 shaft
36 threaded portion
38 housing
40 first retainer ring
42 second retainer ring
44 first axial end 46 second axial end
48 fasteners
50 flange
52 teeth
54 body
56 corresponding teeth
58 first plurality of teeth
60 second plurality of teeth
62 first end portion
64 central portion
66 second end portion
68 first body
70 second body
72 central aperture

What is claimed is:

1. An actuator, comprising:

a wave generator having an interior surface that includes an elliptical portion that at least partially defines an aperture extending through the wave generator, the wave generator being operable to rotate about an axis that extends through the aperture;

a flex ring that extends within the aperture and includes an outer surface having a plurality of teeth for preventing rotation of the flex ring about the axis and an inner surface having a plurality of grooves that extend circumferentially along the inner surface of the flex ring, the inner surface defining a hollow;

a plurality of rollers that extend radially between the outer surface of the flex ring and the elliptical portion of the interior surface of the wave generator, such that rotation of the wave generator about the axis prompts deformation of the flex ring via the plurality of rollers; and a shaft that has a threaded portion and that extends within the hollow defined by the inner surface of the flex ring, wherein the threaded portion of the shaft is operably engaged with the plurality of grooves of the inner surface of the flex ring, such that deformation of the flex ring prompted by rotation of the wave generator about the axis prompts axial displacement of the shaft relative to the flex ring.

2. The actuator of claim 1, wherein the flex ring includes a first axial end and a second axial end opposite the first axial end, and the plurality of teeth extend from the first axial end toward the second axial end.

3. The actuator of claim 2, comprising:

a body with which the plurality of teeth are configured to engage to prevent rotation of the flex ring relative to the body about the axis.

4. The actuator of claim 3, wherein the plurality of teeth extend from the first axial end toward the second axial end along a first end portion of the outer surface of the flex ring that terminates between the first and second axial ends at a central portion of the outer surface of the flex ring, and wherein a radially-outboard-most portion of the first end portion of the outer surface of the flex ring is radially aligned with or radially inboard of the portion of central portion of the outer surface of the flex ring that is circumferentially aligned with the radially-outboard-most portion of the first end portion of the outer surface of the flex ring.

5. The actuator of claim 4, wherein the plurality of teeth is a first plurality of teeth and the body is a first body, and wherein the flex ring includes a second plurality of teeth that extend from the second axial end toward the first axial end along a second end portion of the outer surface of the flex ring that terminates at the central portion of the outer surface, the second plurality of teeth being configured to engage a second body to prevent rotation of the flex ring relative to the second body about the axis.

6. The actuator of claim 1, wherein the shaft is rotationally fixed relative to the axis.

7. An actuator, comprising:

a wave generator operable to rotate about an axis;

a flex ring that includes a first axial end, a second axial end opposite the first axial end, an inner surface that extends between the first and second axial ends and that defines a hollow, and an outer surface opposite the inner surface and having a plurality of teeth proximate the first axial end, the flex ring being operably coupled with the wave generator, such that rotation of the wave generator about the axis prompts deformation of the flex ring;

a body with which the plurality of teeth are configured to engage to prevent rotation of the flex ring relative to the body about the axis; and a shaft that extends through the hollow and is operably coupled with the flex ring, such that deformation of the flex ring prompted by rotation of the wave generator about the axis prompts displacement of the shaft.

8. The actuator of claim 7, wherein the plurality of teeth extend from the first axial end toward the second axial end along a first end portion of the outer surface of the flex ring that terminates between the first and second axial ends at a central portion of the outer surface of the flex ring, and wherein a radially-outboard-most portion of the first end portion of the outer surface of the flex ring is radially aligned with or radially inboard of the portion of central portion of the outer surface of the flex ring that is circumferentially aligned with the radially-outboard-most portion of the first end portion of the outer surface of the flex ring.

9. The actuator of claim 8, wherein the plurality of teeth is a first plurality of teeth and the body is a first body, and wherein the flex ring includes a second plurality of teeth that extend from the second axial end toward the first axial end along a second end portion of the outer surface of the flex ring that terminates at the central portion of the outer surface, the second plurality of teeth being configured to engage a second body to prevent rotation of the flex ring relative to the second body about the axis.

10. The actuator of claim 7, wherein the inner surface of the flex ring includes a plurality of grooves that extend circumferentially along the inner surface of the flex ring, and the shaft has a threaded portion that is operably engaged with the plurality of grooves of the inner surface of the flex ring, such that deformation of the flex ring prompted by rotation of the wave generator about the axis prompts displacement of the shaft.

11. The actuator of claim 7, wherein the wave generator includes an interior surface that includes an elliptical portion that at least partially defines an aperture extending through the wave generator, and wherein the axis about which the wave generator rotates extends through the aperture.

12. The actuator of claim 11, comprising:

a plurality of rollers that extend radially between the outer surface of the flex ring and the elliptical portion of the interior surface of the wave generator, such that rotation of the wave generator about the axis prompts deformation of the flex ring via the plurality of rollers.

13. The actuator of claim 7, wherein deformation of the flex ring prompted by rotation of the wave generator about the axis prompts axial displacement of the shaft.

14. The actuator of claim 13, wherein the shaft is rotationally fixed relative to the axis.

15. An actuator, comprising:

a wave generator operable to rotate about an axis;

a flex ring operably coupled with the wave generator and having a plurality of teeth that engage a body of the actuator to prevent rotation of the flex ring about the axis, wherein rotation of the wave generator about the axis prompts deformation of the flex ring; and a driven component operably coupled with the flex ring, such that deformation of the flex ring prompted by rotation of the wave generator about the axis prompts axial displacement of the driven component relative to the flex ring.

16. The actuator of claim 15, wherein the driven component is a shaft, the wave generator defines an aperture, and the flex ring extends within the aperture radially inboard of the wave generator.

17. The actuator of claim 16, wherein the flex ring defines a hollow, and the shaft extends within the hollow radially inboard of the flex ring.

18. The actuator of claim 17, wherein the flex ring includes an inner surface that defines the hollow and includes a plurality of grooves that extend circumferentially along the inner surface of the flex ring, and the shaft includes a threaded portion that is operably engaged with the plurality of grooves of the inner surface of the flex ring, such that deformation of the flex ring prompted by rotation of the wave generator about the axis prompts axial displacement of the shaft relative to the flex ring.

19. The actuator of claim 15, wherein the driven component is rotationally fixed relative to the axis.

20. The actuator of claim 19, wherein the flex ring is rotationally fixed relative to the axis.

* * * * *